(12) United States Patent
Zollinger et al.

(10) Patent No.: US 6,925,806 B1
(45) Date of Patent: Aug. 9, 2005

(54) VARIABLE GEOMETRY ASSEMBLY FOR TURBOCHARGERS

(75) Inventors: Brent D. Zollinger, Bellflower, CA (US); Patrick A. Rayner, Lomita, CA (US); Kevin P. Slupski, Redondo Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/829,699

(22) Filed: Apr. 21, 2004

(51) Int. Cl.$^7$ .......................... F02D 23/00; F04B 17/00; F01B 25/02
(52) U.S. Cl. ........................ 60/602; 417/406; 415/150; 415/164
(58) Field of Search .......................... 60/602; 415/150, 415/160, 163, 165, 164; 417/406

(56) References Cited

U.S. PATENT DOCUMENTS

| | | | |
|---|---|---|---|
| 4,679,984 A | * | 7/1987 | Swihart et al. .............. 415/163 |
| 4,770,603 A | * | 9/1988 | Engels et al. ................ 415/164 |
| 5,146,752 A | * | 9/1992 | Bruestle ...................... 60/602 |
| 6,145,313 A | * | 11/2000 | Arnold ....................... 60/605.2 |
| 6,672,059 B2 | | 1/2004 | Arnold ......................... 60/602 |
| 6,679,057 B2 | * | 1/2004 | Arnold ......................... 60/602 |
| 6,682,321 B1 | | 1/2004 | Mukherjee et al. |
| 6,739,134 B2 | * | 5/2004 | Fledersbacher et al. ....... 60/602 |
| 2004/0081567 A1 | * | 4/2004 | Boening ..................... 417/406 |

FOREIGN PATENT DOCUMENTS

JP          10212966 A   *  8/1998   .......... F02B 37/24

* cited by examiner

Primary Examiner—Thai-Ba Trieu
(74) Attorney, Agent, or Firm—Ephraim Starr; Chris James

(57) ABSTRACT

A variable geometry turbocharger assembly employing the present invention includes a center housing, a compressor housing attached to one side of the center housing, and a turbine housing attached to another side of the center housing. A plurality of movable vanes is disposed within the turbine housing, and a unison ring is rotatably disposed within the turbine housing to move the vanes in unison. The turbocharger includes a unison ring assembly of this invention that includes an insert that is separate from and attached to the center housing. The support has one or more surfaces to carry the unison ring, and the unison ring is rotatably positioned on the support. The support further provides a space that isolates the unison ring from making contact with contacting the center housing. A heat shroud optionally extends radially inwardly along the center housing and is retained into position by the support.

14 Claims, 7 Drawing Sheets

VARIABLE GEOMETRY ASSEMBLY FOR TURBOCHARGERS

FIELD OF THE INVENTION

This invention relates generally to the field of variable geometry turbochargers and, more particularly, to an improved unison ring assembly disposed therein that is designed to provide improved ventilation between the unison ring and center housing, thereby controlling the buildup of moisture and minimizing the unwanted development of corrosion therein to provide improved unison ring operation and extended turbocharger service life.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft and housed in a compressor housing. Thus, rotary action of the turbine also causes the air compressor to spin within a compressor housing of the turbocharger that is separate from the turbine housing. The spinning action of the air compressor causes intake air to enter the compressor housing and be pressurized or boosted a desired amount before it is mixed with fuel and combusted within the engine combustion chamber.

In a turbocharger it is often desirable to control the flow of exhaust gas to the turbine to improve the efficiency or operational range of the turbocharger. Variable geometry turbochargers have been configured to address this need. A type of variable geometry turbocharger is one having a variable exhaust nozzle, referred to as a variable nozzle turbocharger. Different configurations of variable nozzles have been employed in variable nozzle turbochargers to control the exhaust gas flow. One approach taken to achieve exhaust gas flow control in such variable nozzle turbochargers involves the use of multiple pivoting vanes that are positioned annularly around the turbine inlet. The pivoting vanes are commonly controlled by a unison ring, that is movably disposed within the turbocharger, to alter the throat area of the passages between the vanes, thereby functioning to control the exhaust gas flow into the turbine.

In such variable nozzle turbochargers, the unison ring is configured to rotate in response to a controlled actuator movement, which rotational movement causes the vanes to pivot in a manner opening or closing the flow path of exhaust gas to the turbine wheel. In order for the variable nozzle turbocharger to function properly, it is important that the desired rotational movement of the unison ring not be restricted or impaired. It is known that in such variable nozzle turbochargers, impaired unison ring movement can result from the build up of moisture within the turbocharger, which is known to cause unwanted corrosion between the unison ring and adjacent turbocharger surfaces. This corrosion can operate to impair and restrict proper unison ring movement with the turbocharger.

It is, therefore, desirable that a unison ring assembly be constructed, for use with a variable nozzle turbocharger, in a manner that facilitates desired unison ring movement in a manner that minimizes or eliminates altogether potential impairments to movement caused, e.g., by moisture build up and corrosion.

SUMMARY OF THE INVENTION

A variable geometry turbocharger assembly employing the present invention includes a center housing having a shaft disposed therethrough, a compressor housing attached to one side of the center housing and having an impeller rotatably disposed therein and attached to one end of the shaft, and a turbine housing attached to another side of the center housing and having a turbine wheel rotatably disposed therein and attached to an opposite end of the shaft. A plurality of movable vanes is disposed within the turbine housing, and a unison ring is rotatably disposed within the turbine housing and is in contact with the plurality of vanes to move the vanes in unison.

The variable geometry turbocharger includes a unison ring assembly in the form of an insert or support that is separate from and that is attached to a surface of the center housing. The support has one or more surfaces to carry the unison ring, and the unison ring is rotatably positioned on the support. In an example embodiment, the support includes a first surface adjacent an inside diameter of the unison ring to radially carry the unison ring, and a second surface adjacent an inside surface of the unison ring to axially carry the unison ring. The support further provides a space that isolates the unison ring from making contact with the center housing. An optional heat shroud may be extended radially inward from the insert along the center housing and retained into position by the support.

Configured in this manner, the unison ring assembly operates to prevent direct contact between the unison ring and the center housing, thereby minimizing or eliminating the potential that desired movement of the unison ring would be impaired or prevented by corrosion at the center housing surface. Further, the unison ring support is preferably formed from the same material as the unison ring to prevent unwanted differential thermal expansion effects that could otherwise impair desired unison ring movement. Additionally, the support enables use of a smaller and more cost effective heat shroud.

BRIEF DESCRIPTION OF THE DRAWINGS

The details and features of the present invention will be more clearly understood with respect to the detailed description and drawings in which.

DETAILED DESCRIPTION OF THE INVENTION

Variable geometry turbocharger assemblies including unison ring assemblies of this invention generally comprise a unison ring insert or support that is separate from and attached to a center housing surface. The support is configured to carry the unison ring, both axially and radially, and isolate the unison ring from contact with the center housing surface. An optional heat shroud can extend radially from the support across the center housing surface and be held or retained into position by the support.

Figure 1:
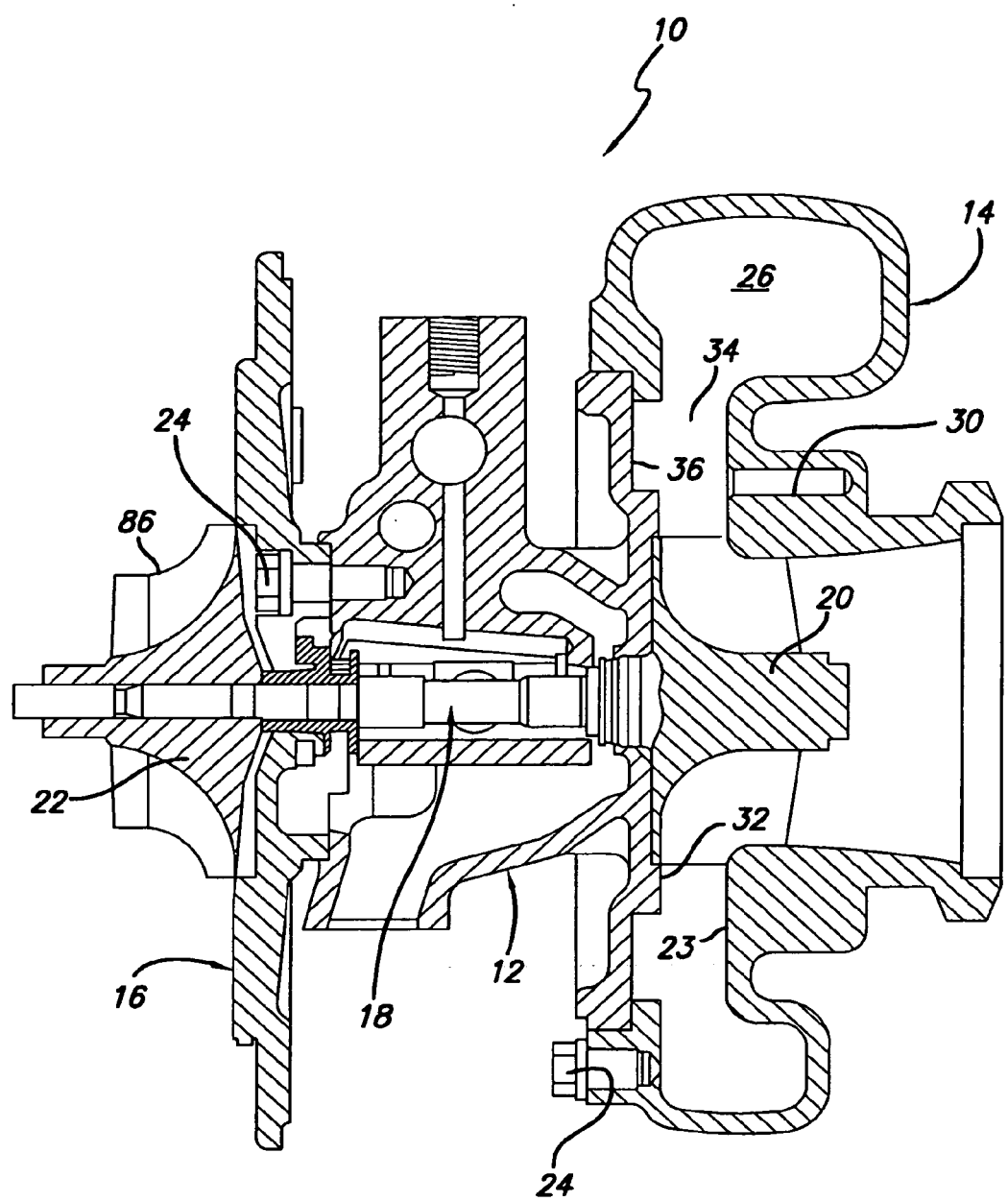
FIG. 1 is a cross-sectional side elevation illustrating a prior art turbine housing, center housing and compressor backing plate with the turbine shaft wheel assembly and compressor impeller as supported by the bearing system.

FIG. 1 illustrates a prior art turbocharger assembly 10 generally comprising a center housing 12 having a turbine housing 14 attached at one end, and a compressor backing plate 16 housing attached at an opposite end. A compressor housing is conventionally attached to the compressor backing plate. A shaft 18 is rotatably disposed within a bearing assembly contained within the center housing. A turbine or turbine wheel 20 is attached to one shaft end and is carried within the turbine housing, and a compressor impeller 22 is attached to an opposite shaft end and is carried within the compressor housing. The turbine and compressor backing plate are attached to the center housing by bolts 24 that extend therebetween. While the turbocharger assembly illustrated in FIG. 1 is constructed to accommodate variable geometry members, such as a unison ring and a plurality of vanes, such members are not illustrated.

The turbine housing 14 includes a volute 26 that is in gas flow communication with an exhaust inlet for receiving exhaust gas and directing it to the turbine wheel. The turbine housing includes a nozzle wall 28 interposed between the volute and the turbine wheel. The nozzle wall 28 includes a plurality of holes 30 disposed therein for accommodating pins that project from respective vanes (best shown in FIGS. 2 and 3). The center housing includes a surface 32 opposite the nozzle wall that together operate to define a flow passage 34 from the volute to the turbine wheel. The surface 32 includes a recessed section 36 that is specially configured to accommodate placement of an annular unison ring directly thereagainst for the purpose of carrying its radially and axially directed loads.

Figure 2:
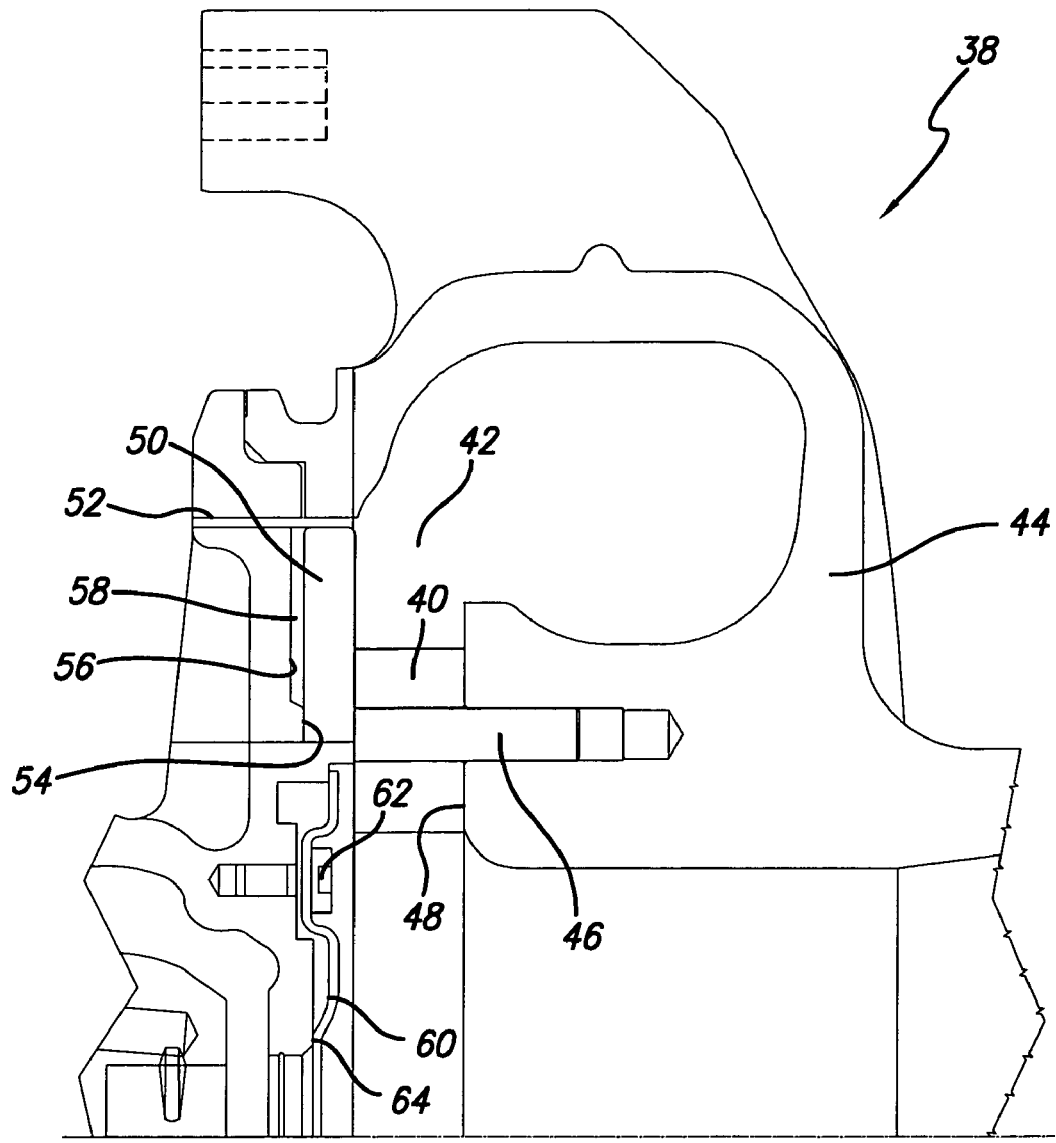
FIG. 2 is a cross-sectional side elevation illustrating a section of the prior art turbocharger assembly including the center housing, the turbine housing, a unison ring, a vane, and a heat shroud.

FIG. 2 illustrates a partial view of another prior art variable geometry turbocharger assembly 38 comprising many of the same general components as the turbocharger discussed above and illustrated in FIG. 1. A plurality of vanes 40 are movably disposed within the exhaust flow passage 42 of the turbine housing 44, and a post 46 is used to connecting each vane to the nozzle wall 48. An annular unison ring 50 is positioned within the turbine housing, and is carried by a shoulder portion 54 of the center housing surface. The unison ring is in direct contact with the center housing. The unison ring is rotatably movable within the turbocharger via a suitable actuator assembly such as that disclosed an illustrated in U.S. Pat. No. 6,269,642, which is incorporated herein by reference.

The center housing surface further includes a recessed portion 56 that extends radially outwardly a distance from the shoulder and that provides an annular space 58 between an inside surface of the unison ring and the center housing. The recessed portion operates to provide a ventilation path for air to circulate behind the unison ring to help control the unwanted accumulation of moisture therebetween.

Moving radially inwardly from the shoulder portion 54, the center housing includes an annular heat shroud 60 that is attached thereto by a number of bolts 62. The heat shroud is a disk-shaped annular construction that is configured to fit over the region of the center housing surface extending roughly between the unison ring and a central shaft opening 64. The heat shroud operates to control the amount of heat transfer from the turbine housing to the central housing.

As indicated above, such prior art turbocharger assembly constructions are configured so that the unison ring is carried by and is in direct contact with a portion of the center housing surface. Because the center housings for such turbocharger assemblies are conventionally formed from cast iron, and because moisture is known to develop between the unison ring and center housing, the development of unwanted corrosion is oftentimes unavoidable in this area of the turbocharger. The presence of corrosion at the critical interface between the unison ring and the center housing is known to impair and sometimes prevent proper unison ring rotational movement, thereby restricting or preventing desired vane operation.

Figure 3:
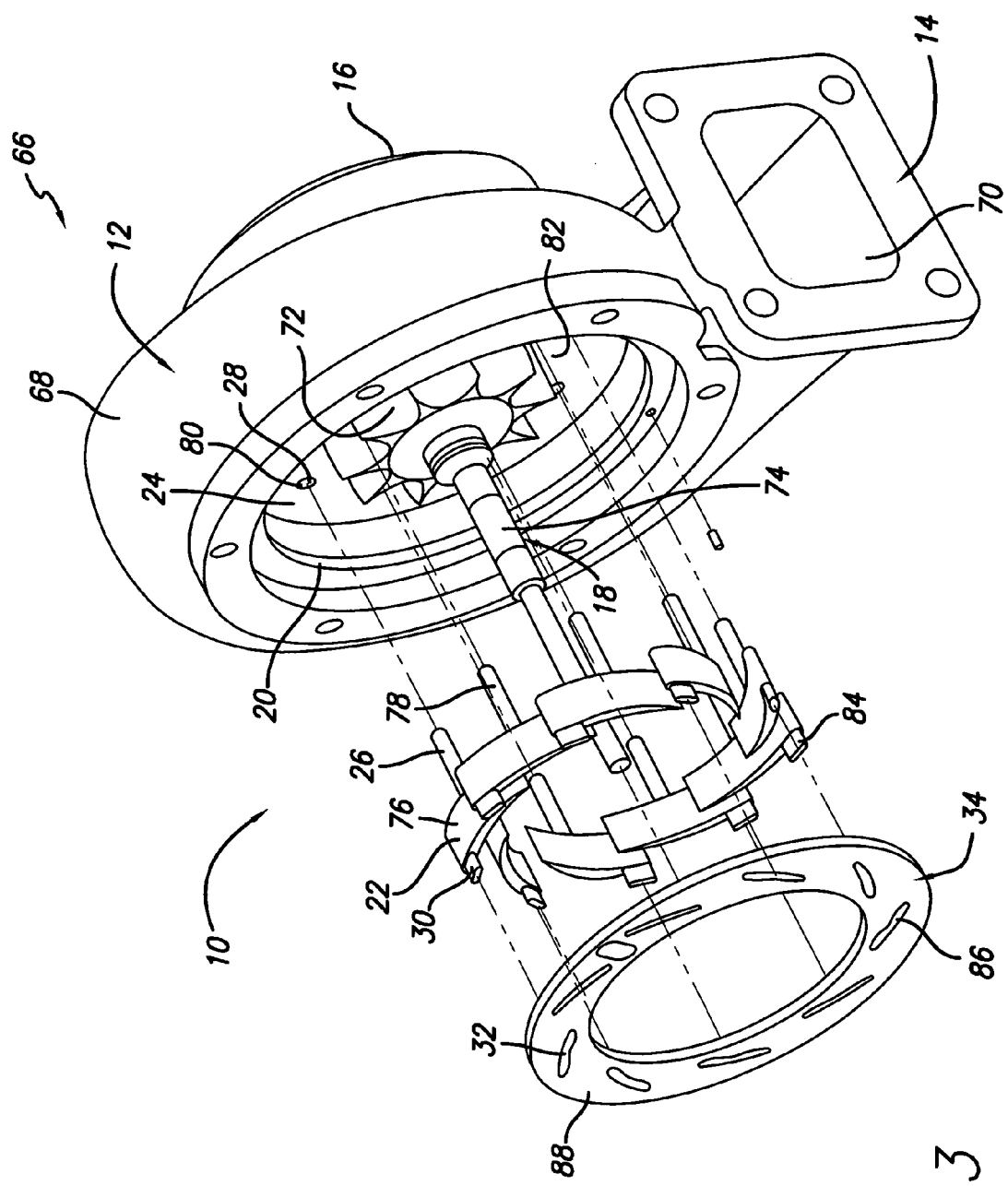
FIG. 3 is an exploded view of a turbocharger assembly comprising the turbocharger housing, a turbine wheel, a shaft, a plurality of vanes, and the unison ring.

FIG. 3 illustrates an exploded partial view of a variable geometry turbocharger assembly 66 constructed to include a unison ring assembly of this invention. The turbocharger assembly comprises a turbine housing 68 having an exhaust inlet 70, and having a turbine wheel 72 movably disposed within the housing and attached to a shaft 74. A plurality of vanes 76 are shown each having posts 78 projecting therefrom to be received by respective holes 80 in the nozzle wall 82, and also having tabs 84 projecting therefrom to be received by respective slots 88 in the unison ring 86. It is to be understood that this is but one embodiment of how the vanes can be configured to cooperate with the nozzle wall and unison ring, and that other means for connecting the vanes thereto can be used and are intended to be within the scope of this invention.

Figure 4:
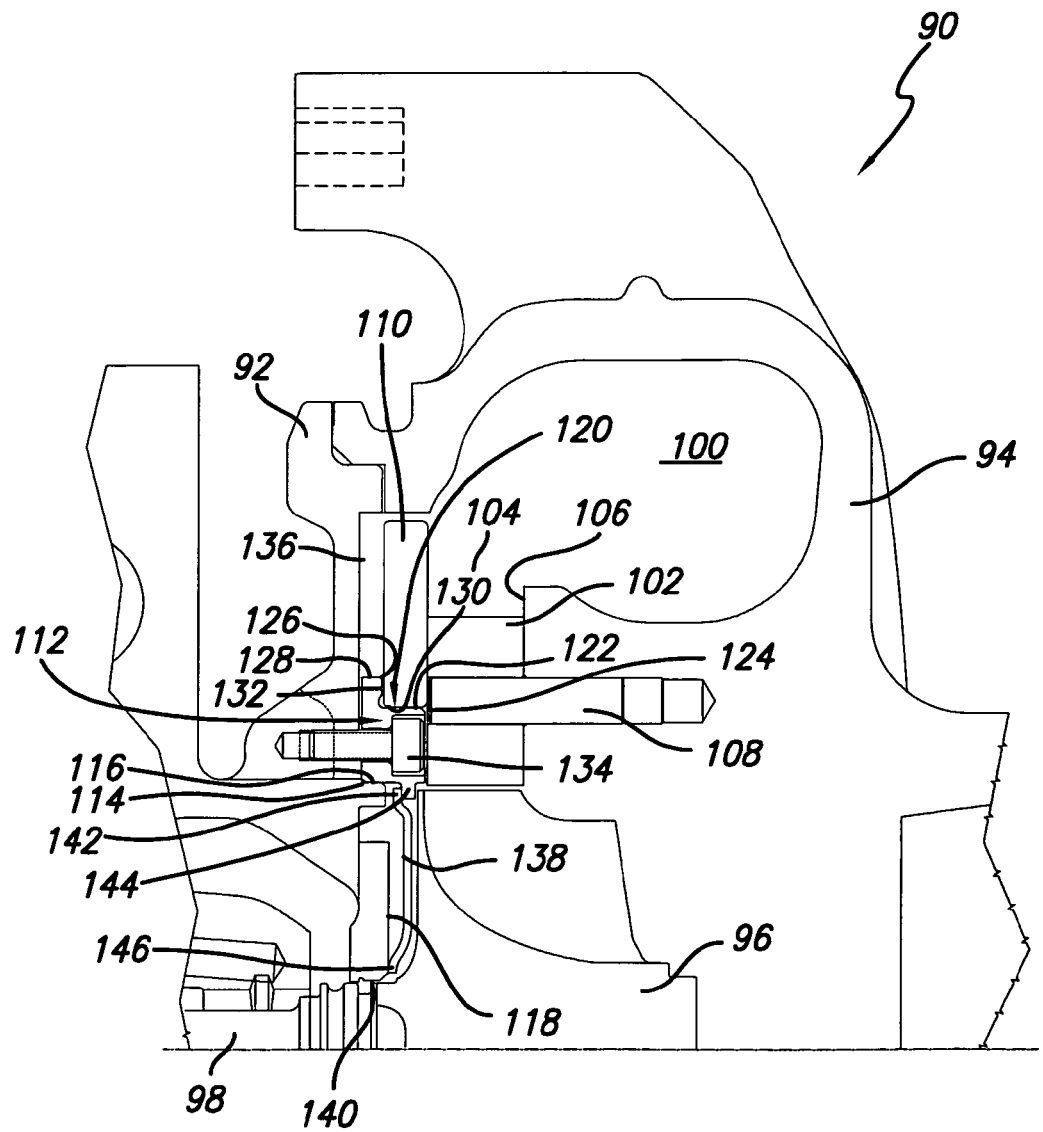
FIG. 4 is a cross-sectional side elevation illustrating a section of a turbocharger assembly, constructed according to one embodiment of this invention, including a center housing, a turbine housing, a unison ring, a vane, an insert, and a heat shroud.

FIG. 4 illustrates a partial view of one embodiment of a variable geometry turbocharger assembly 90 comprising a unison ring assembly of this invention. The turbocharger assembly comprises a center housing 92, a turbine housing 94 attached to the center housing, and a turbine wheel 96 mounted on a shaft 98 and rotatably disposed within the turbine housing. The turbine housing includes a volute 100 as described above and a plurality of movable vanes 102 disposed within the exhaust gas passage 104 connected to the nozzle wall 106 by posts 108. An annular unison ring 110 is rotatably disposed within the turbine housing and is configured in the manner described above to engage and move the plurality of vanes in unison.

Unlike the prior art turbocharger assemblies described above, this turbocharger assembly is specially configured to avoid the problem relating to the unison ring impairment of movement resulting from direct contact of the unison ring with the center housing. Specifically, this turbocharger assembly is constructed including a unison ring assembly that is specially engineered to address this problem. The assembly comprises a unison ring insert or support 112 that is formed as a separate element, and that is attached to the center housing to support the unison ring 110 and isolate the unison ring from direct contact with the center housing. The unison ring insert or support 112 is specially configured to carry or support the unison ring's axial and radial loads.

The unison ring insert or support 112 is preferably provided in the form of an annular ring having an inside diameter 114 sized and shaped for placement adjacent a circumferential edge 116 in the center housing surface 118 that serves to pilot and center the insert. Alternatively, the insert can be provide in the form of a number of separate members positioned at equidistant or nonequidistant intervals along the center housing surface. The insert has an outside diameter 120 that includes a first surface portion or neck 122 having a first diameter that extends a distance from an insert outer axial surface 124, and a second surface portion or shoulder 126 that extends radially outwardly a distance to a peripheral edge 128 of the insert having a second diameter that is greater than the first diameter.

The insert first surface portion 122 is configured to accommodate placement of an inner diameter 130 of the unison ring thereagainst to carry the radial load of the unison ring. The insert second surface portion 126 is configured to accommodate placement of an inside surface portion 132 of the unison ring, e.g., a portion of the inside surface adjacent the unison ring inside diameter, thereagainst to carry the axial load of the unison ring. In an example embodiment, the unison ring insert is attached to the center housing by a number of fasteners 134. Alternatively, the insert can be attached to the center housing by other conventional attachment means such as by pressed fit, staking or the like.

In an example embodiment, as illustrated in FIG. 4, the insert second surface portion 126 is configured in a manner, e.g., having an axial thickness, that provides a desired distance or space 136, e.g., annular space, between the remaining portion of the unison ring inside surface 132 and the center housing. The presence of such annular space 136 is desired for the purpose of ventilating and providing air circulation between the unison ring and center housing to control unwanted moisture accumulation. Additionally, the insert second surface portion 126 can be configured to itself include a recessed portion that does not contact the unison ring for the purpose of providing an air space therebetween to facilitate air circulation for controlling moisture build up.

The insert is preferably formed from a material that, unlike the cast iron center housing, is resistant to corrosion. Additionally, for purposes of maintaining a desired spatial tolerance between the insert and the unison ring during the thermal cycles inherent in turbocharger operation, it is desired that the insert be formed from a metallic material having a coefficient of thermal expansion that is the same or similar to that of the unison ring. In an example embodiment, the unison ring and the unison ring insert are both formed from stainless steel. The insert can be formed by powder metal, casting or machining process. In an example embodiment, the unison ring insert is formed by machining process.

Moving radially inwardly from the unison ring insert 122, a heat shroud 138 is positioned over the center housing surface that extends from the unison ring insert to a central shaft opening 140. It is to be understood that the heat shroud is an optional member and may or may not be used with the unison ring insert of this invention, depending on the particular turbocharger configuration and application. In an example embodiment, the heat shroud is preferably provided in the form of a disk-shaped annular member having a peripheral edge 142 that is sized and shaped to be held into position against the center housing surface by a portion 144 of the insert, e.g., in the form of a lip projecting from the insert inside diameter. The heat shroud has a centrally-positioned opening 146 that is sized and shaped for placement against a portion of the center housing surface adjacent the shaft opening 140. The unison ring insert or support 112, is considered to be a unison ring assembly.

The optional heat shroud 138 serves to control the extent of heat transfer from the turbine housing to the center housing, and can be formed from any type of material capable of providing the desired properties of structural rigidity and heat transfer. In an example embodiment, the heat shroud is formed from a corrosion resistant material such as stainless steel or the like. Unlike the heat shroud used with the prior art turbocharger assembly discussed above, the heat shroud used in this invention is not connected to the center housing by bolted connection. Rather, the heat shroud of this invention is configured to operate like a Belleville washer and be held into place by its cooperation with the unison ring Insert. The heat shroud can be made in the same manner used to make the prior art heat shroud.

Figure 5:
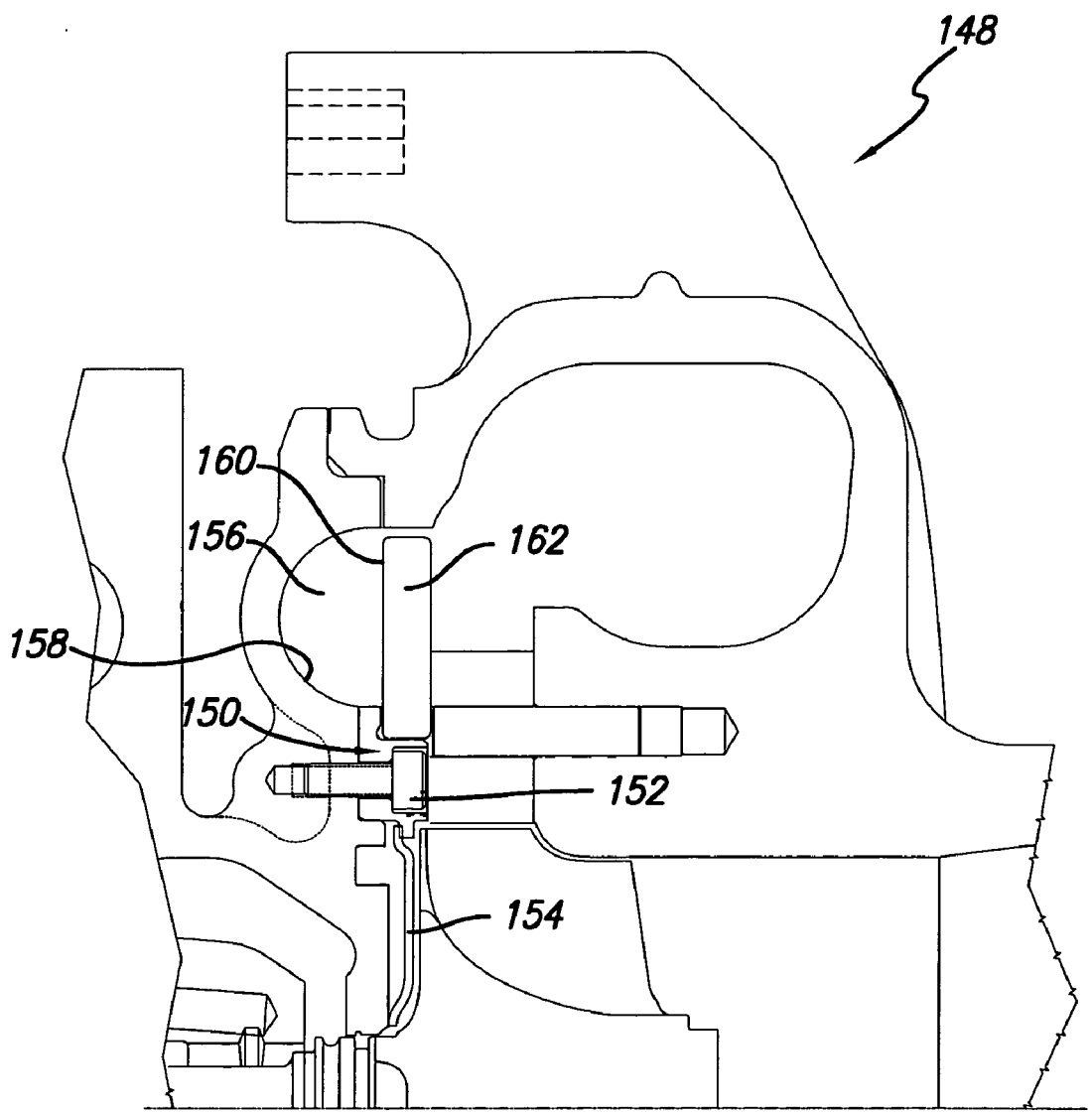
FIG. 5 is a cross-sectional side elevation illustrating a section of a turbocharger assembly, constructed according to another embodiment of this invention, including a center housing, a turbine housing, a unison ring, a vane, an insert, and a heat shroud.

FIG. 5 illustrates a partial view of another embodiment of a variable geometry turbocharger assembly 148 that includes the same unison ring assembly discussed above and illustrated in FIG. 4, comprising the unison ring insert 150. Unison ring insert fasteners 152 are used to connect the insert to the center housing surface, and an optional head shroud 154 is held in place against the center housing by the insert. A difference with this embodiment, however, is in the shape of the recessed portion or annular space 156 between the center housing surface 158 and the inside surface 160 of the unison ring 162. Specifically, this embodiment includes an enlarged annular space 156 that is provided in the form of a semi circular or "C"-shaped channel configured into the center housing surface. The enlarged annular space functions to provide a further degree of air circulation and ventilation between the unison ring and the center housing to provide an enhanced amount of control over unwanted moisture accumulation therebetween.

It is to be understood that the embodiments described above and illustrated in FIGS. 4 and 5 provide but a few exemplary constructions of variable geometry turbocharger assemblies configured to accommodate unison ring assemblies of this invention. As noted above, the particular configuration of such structural elements as the insert, shroud and annular space can vary from what has been specifically described and illustrated, and it is to be understood that any such variances in design that capture the spirit of this invention are intended to be included within the scope of this invention.

Figure 6:
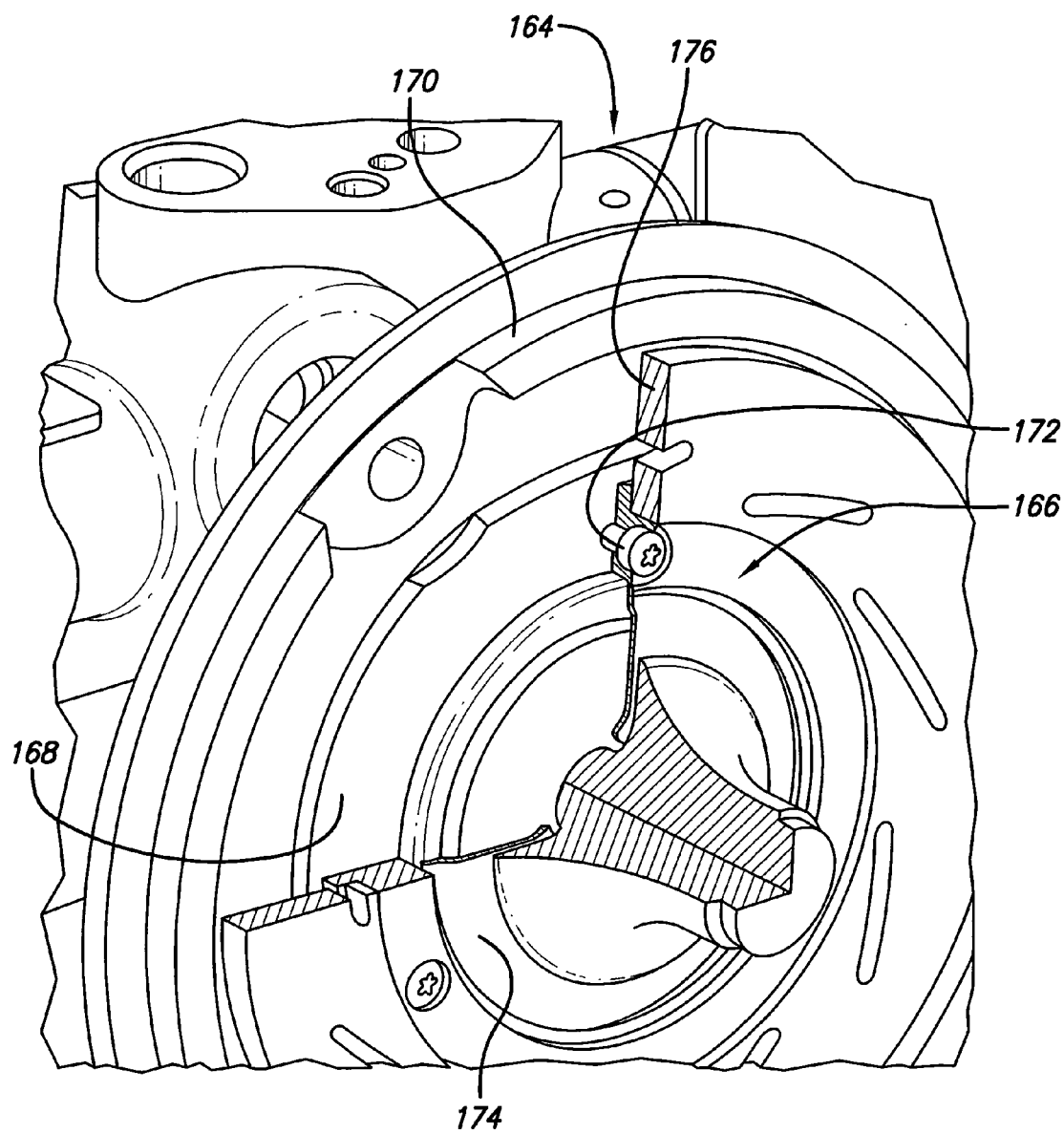
FIG. 6 is a front perspective illustrating in cut-away form the turbocharger assembly of this invention, including the compressor housing, unison ring, unison insert, and heat shroud without the turbine housing.

FIG. 6 illustrates a sectional view of a partially-assembled variable geometry turbocharger assembly 164 without the turbocharger housing for purposes of reference and clarity in showing how the unison ring assembly is positioned and attached to the center housing. The unison ring insert 166 is attached to the inside surface 168 of the center housing 170 by a number of fasteners 172. In an example embodiment, where the unison ring insert is formed from stainless steel, the fasteners are also provided in the form of threaded bolts. The heat shroud 174 is pressed into position adjacent the center housing inner surface by the placement of a portion of the insert over the heat shroud outer edge.

The unison ring 176 is positioned into rotatable placement around the insert in the manner described above, with the unison ring inside diameter positioned adjacent the insert first surface portion, and a portion of the unison ring inside surface adjacent the insert second surface portion so that the insert carries the unison ring both axially and radially.

Figure 7:
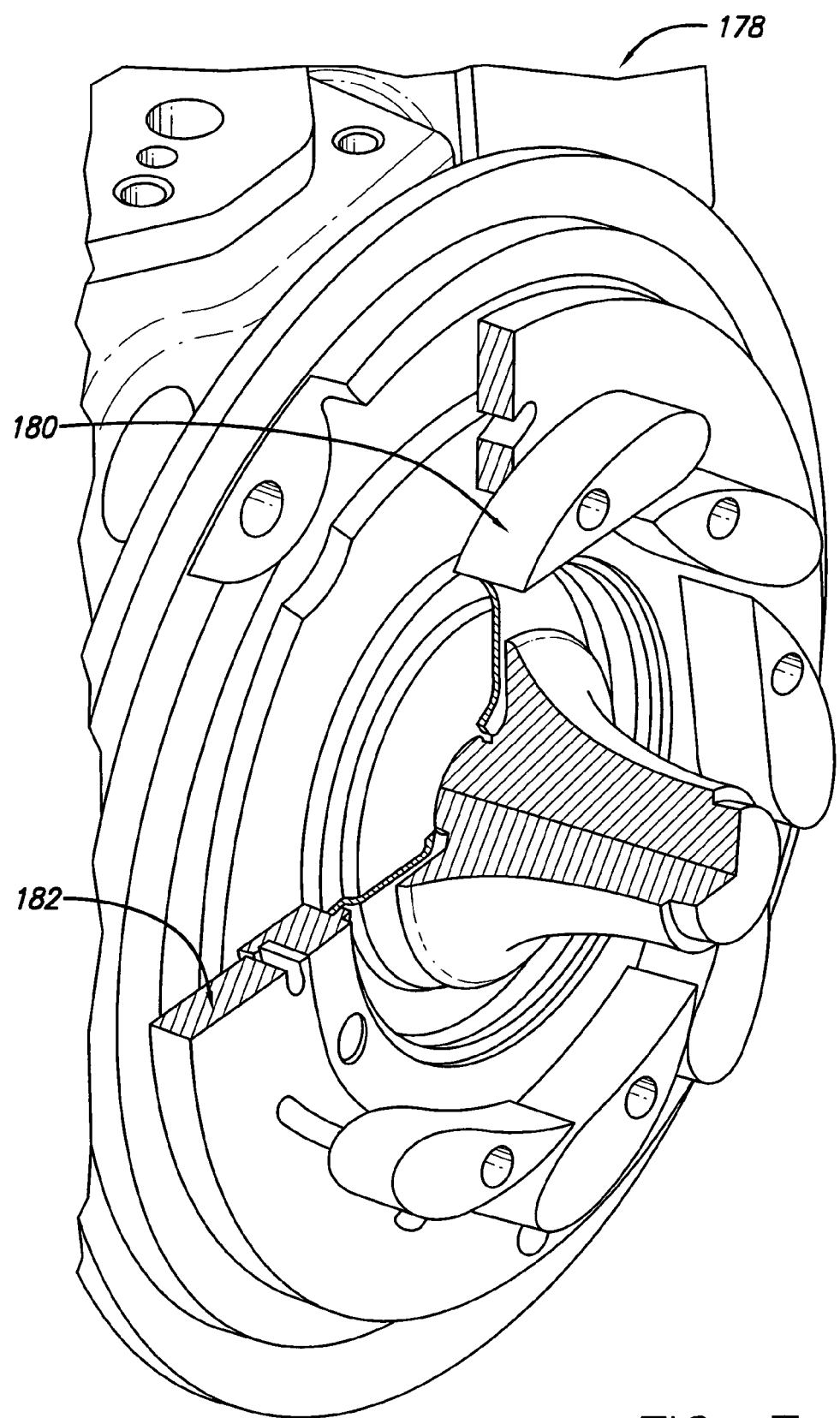
FIG. 7 is a front perspective illustrating in cut-away form the turbocharger assembly of this invention, including the compressor housing, unison ring, plurality of vanes, unison insert, and heat shroud without the turbine housing.

FIG. 7 is similar to FIG. 6 in that it illustrates a partially-assembled variable geometry turbocharger assembly 178. The main difference in this illustration is the additional presence of the plurality of vanes 180 that are positioned adjacent the unison ring 182.

A feature of variable geometry turbochargers comprising the unison ring assembly, as described above and illustrated in FIGS. 4 to 7, is that the unison ring insert or support is specifically designed and constructed to be separate from the center housing, and carry the axial and radial loads of the unison ring in a manner that isolates the unison ring from direct contact with the center housing. The unison ring insert is formed from a corrosion resistant material having the same or similar coefficient of thermal expansion as the unison ring, thereby helping to avoid unwanted impairment or restriction of desired unison ring movement by the presence of corrosion or by thermally-induced expansion or contraction. Designing and constructing the insert in this manner avoids the costly alternative of having to make the entire center housing from a corrosion resistant material such as stainless steel.

A further feature of the unison ring insert is that it is further configured to provide an annular space between the unison ring and the center housing for the purpose of providing an air circulation and ventilation path between the unison ring and the center housing. This is desired to control and minimize the unwanted accumulation of moisture therebetween.

A still further feature of the unison ring insert of this invention is that it functions to both locate and retain the heat shroud. This enables the heat shroud to be made smaller and thinner, without the need for itself to be attached by bolts or other types of fasteners, thereby enabling the heat shroud to be made in a more cost effective manner.

Although the specific embodiments of variable geometry turbochargers comprising unison ring assemblies of this invention have been described above and illustrated, it is to be understood that modifications and variations of this configuration may be apparent to those skilled in the art, and that such modifications and variations are intended to be within the scope of this invention.

What is claimed is:

1. A method for constructing a variable geometry turbocharger assembly comprising a center housing, a turbine housing attached to the center housing, a turbine wheel rotatably disposed in the turbine housing, a plurality of vanes movably disposed within the turbine housing, and a unison ring rotatably disposed within the turbine housing and in contact with the plurality of vanes, the method comprising the steps of:

placing a heat shroud over a surface of the center housing directed towards the turbine housing;

attaching a unison ring support to the surface of the center housing, the support including a surface portion that contacts the heat shroud and retains the heat shroud in place, the support including one or more surfaces for accommodating rotatable placement of the unison ring thereagainst; and mounting the unison ring onto the support so that an inside diameter of the unison ring is in contact with a first surface portion of the support, and an inside surface of the unison ring is in contact with a second surface portion of the support.

2. The method as recited in claim 1 wherein during the step of mounting, the support operates to prevent contact between the unison ring and the center housing.

3. A unison ring assembly for use in a variable geometry turbocharger assembly comprising a center housing, a turbine housing attached to the center housing, a turbine wheel rotatably disposed in the turbine housing, plurality of vanes movably disposed within the turbine housing upstream of the turbine wheel, and a unison ring rotatably disposed within the turbine housing and in contact with the plurality of vanes, the unison ring assembly comprising a support that is separate from the center housing and that is attached to a surface of the center housing, wherein the unison ring is rotatably mounted onto the support, the support including one or more surfaces in contact with the unison ring to carry axially and radially directed loads from the unison ring, and wherein the support includes a first radially directed surface for accepting placement of an inside diameter of the unison ring thereon, and a second axially directed surface for accepting placement of an inside surface of the unison ring thereon.

4. The unison ring assembly as recited in claim 1 wherein the support second axially directed surface projects away from the center housing surface to provide a space between the unison ring and the center housing surface.

5. The unison ring assembly as recited in claim 1 further comprising a heat shroud that extends radially inwardly across the center housing surface from the support to a central shaft opening in the center housing, the heat shroud being retained in place by the support.

6. The unison ring assembly as recited in claim 5 wherein the support includes a surface portion is positioned over an adjacent portion of the heat shroud to retain the heat shroud in place.

7. A unison ring assembly for use in a variable geometry turbocharger assembly comprising a center housing, a turbine housing attached to the center housing, a turbine wheel rotatably disposed in the turbine housing, plurality of vanes movably disposed within the turbine housing upstream of the turbine wheel, and a unison ring rotatably disposed within the turbine housing and in contact with the plurality of vanes, the unison ring assembly comprising a support that is separate from the center housing and that is attached to a surface of the center housing, wherein the unison ring is rotatably mounted onto the support, the support including one or more surfaces in contact with the unison ring to carry axially and radially directed loads from the unison ring, and wherein the support includes an outside diameter having a neck that extends outwardly from a support outside surface that accepts placement of an inside diameter of the unison ring thereagainst, and a shoulder that extends radially outwardly from the neck that accepts placement of an inside surface of the unison ring thereagainst.

8. The unison ring assembly as recited in claim 7 wherein the shoulder extends a distance away from the center housing to provide a distance between the unison ring and the center housing.

9. A variable geometry turbocharger assembly comprising:

a center housing comprising a shaft disposed therethrough;

a compressor housing attached to one side of the center housing and having an impeller rotatably disposed therein and attached to one end of the shaft;

a turbine housing attached to another side of the center housing and having a turbine wheel rotatably disposed therein and attached to an opposite end of the shaft;

a plurality of movable vanes disposed within the turbine housing;

a unison ring rotatably disposed within the turbine housing and in contact with the plurality of vanes to move the vanes in unison; and a support separate from and attached to a surface of the center housing, the support having one or more surfaces to carry the unison ring, wherein the unison ring is rotatably positioned on the support, wherein the support includes a first surface adjacent an inside diameter of the unison ring to radially carry the unison ring, and a second surface adjacent an inside surface of the unison ring to axially carry the unison ring.

10. The variable geometry turbocharger assembly as recited in claim 9 wherein the support provides a space that isolates the unison ring from contacting the center housing.

11. The variable geometry turbocharger assembly as recited in claim 9 further comprising a heat shroud extending radially inwardly along the center housing, the heat shroud being retained into position by the support.

12. The variable geometry turbocharger assembly as recited in claim 11 wherein the support includes a surface along the inside diameter that contacts the heat shroud to retain the heat shroud in place.

13. A variable geometry turbocharger assembly comprising:

a center housing comprising a shaft disposed therethrough;

a compressor housing attached to one side of the center housing and having an impeller rotatably disposed therein and attached to one end of the shaft;

a turbine housing attached to another side of the center housing and having a turbine wheel rotatably disposed therein and attached to an opposite end of the shaft;

a plurality of movable vanes disposed within the turbine housing;

a unison ring rotatably disposed within the turbine housing and in contact with the plurality of vanes to move the vanes in unison; and a support separate from and attached to a surface of the center housing, the support having one or more surfaces to carry the unison ring, wherein the unison ring is rotatably positioned on the support, and wherein the support includes an outside diameter having a first surface portion that extends outwardly from a support outside surface and that accepts placement of an inside diameter of the unison ring thereagainst, and a second surface portion that extends radially outwardly from the first surface portion and that accepts placement of an inside surface of the unison ring thereagainst.

14. A variable geometry turbocharger assembly comprising:

a center housing comprising a shaft disposed therethrough;

a compressor housing attached to one side of the center housing and having an impeller wheel rotatably disposed therein and attached to one end of the shaft;

a turbine housing attached to another side of the center housing and having a turbine wheel rotatably disposed therein and attached to an opposite end of the shaft;

a plurality of movable vanes disposed within the turbine housing;

an annular unison ring rotatably disposed within the turbine housing and in contact with the plurality of vanes to move the vanes in unison; and an annular support that is separate from and attached to a surface of the center housing, the support comprising:
an outside diameter having a first surface portion that extends outwardly from a support outside surface and that accepts placement of an inside diameter of the unison ring thereagainst, and a second surface portion that extends radially outwardly from the first surface portion and that accepts placement of an inside surface of the unison ring thereagainst; and
an inside diameter that includes a radially projecting lip;
an annular heat shroud extending radially inwardly along the center housing surface extending from the support, the heat shroud being retained into position by placement of the support lip thereagainst.

* * * * *